Aug. 4, 1970     P. E. COFFEY ET AL     3,522,431
GAS CONVERSION APPARATUS AND METHOD FOR PRODUCING
CONDENSATION NUCLEI
Filed Dec. 26, 1967
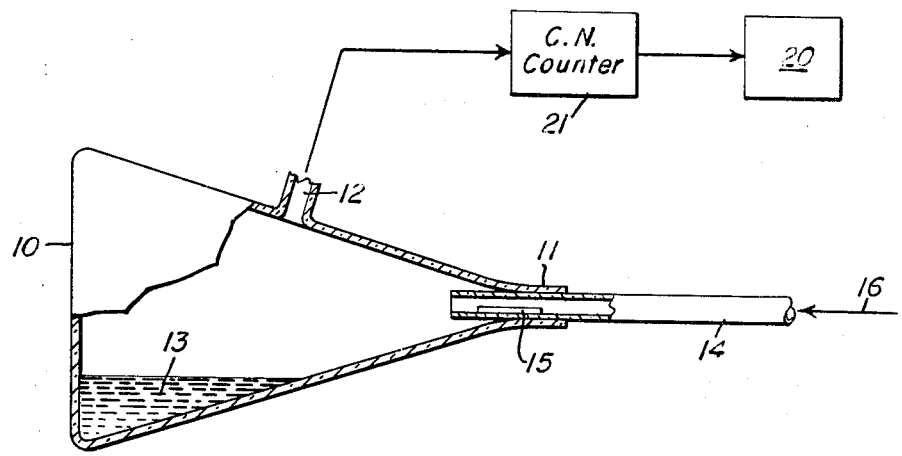
Inventors:
Peter E. Coffey;
Theodore A. Rich,
by John M. Davis
Their Attorney.

United States Patent Office 3,522,431
Patented Aug. 4, 1970

---

3,522,431
GAS CONVERSION APPARATUS AND METHOD FOR PRODUCING CONDENSATION NUCLEI
Peter E. Coffey, Ballston Spa, and Theodore A. Rich, Scotia, N.Y., assignors to General Electric Company, a corporation of New York
Filed Dec. 26, 1967, Ser. No. 693,334
Int. Cl. G01n 23/12
U.S. Cl. 250—43.5        5 Claims

ABSTRACT OF THE DISCLOSURE

The invention disclosed herein relates to the detection and measurement of a chemically reactive gas such as ammonia contained in a relatively chemically inert gas such as air. The gas mixture is exposed to a radioactive material which emits ionizing radiation and ionizes the gas. The ionized gas is then treated with a chemical reagent vapor to produce condensation nuclei from the chemically reactive gas which are suspended in the carrier gas. The condensation nuclei are then counted in a conventional condensation nuclei counter.

---

The invention described herein was made in the course of or under a contract with the Department of the Army.

CROSS-REFERENCE

S.N. 516,013, filed Dec. 23, 1965 entitled "Improved Ammonia Detection Apparatus," 14D–3189, George F. Skala, and assigned to the assigneee of the present application.

BACKGROUND OF THE INVENTION

The present invention relates to a method and apparatus useful in the detection of a chemically reactive gas in other less reactive or inactive gases including air, and, more specifically to the conversion of such a chemically reactive gas into particles or condensation nuclei which may then be measured.

One known means for detecting the presence of ammonia gas in another gas is to convert the ammonia into particles or condensation nuclei in an acid-base reaction and then to detect the presence of the particles. It will be appreciated that the other gas does not react with the acid vapor to produce solid particles and functions as a carrier for the nuclei. This can be done by introducing the ammonia bearing gas into an atmosphere of, for example, HCl vapor to form very small ammonium chloride particles or nuclei and then detecting the nuclei by means of a condensation nuclei detector. A condensation nuclei detector is a device in which air or other carrier gases containing very small particles, or condensation nuclei, is introduced into a supersaturated gas whereupon water vapor condenses upon the condensation nuclei to produce a composite particle capable of scattering light. By using known techniques, the degree of scattering can be measured and the concentration of ammonia in the original ammonia-gas mixture determined.

In the previously referenced co-pending Skala application, it is shown that by treating the gas mixture with a corona discharge which is believed to produce ions therein, the sensitivity of this process may be greatly increased. While the disclosed apparatus functions quite well, it would be advantageous if similar results could be achieved without the use of the corona for a number of reasons. For example, where the apparatus is to be portable, the electrical components necessary to generate the corona discharge are quite heavy. For certain uses, transformer hum is undesirable. Furthermore, the corona discharge phenomenon is sensitive to changes in atmospheric conditions and the electrical supply voltage. The high corona potential tends to drive ionized gases to the walls of the reaction chamber. The ultraviolet light produced by the corona discharge can produce spurious signals if the gas being monitored is contaminated by sulfur dioxide. For all these reasons, it would be desirable to eliminate the need for the corona discharge with no substantial diminution in the sensiivity of the apparatus.

It is therefore a principal object of this invention to provide a highly sensitive means for the detection of a chemically reactive gas in a carrier gas without the use of a corna discharge.

It is another object of this invention to provide an ammonia converting apparatus which yields a large number of nuclei per volume of ammonia containing gas.

Other and specifically different objects of this invention will become apparent to those skilled in the art from the following description of the invention taken in conjunction with the accompanying drawing which is a schematic illustration with parts broken away of the apparatus of the invention.

More specifically and by way of example, the apparatus comprises a reaction chamber 10 provided with an inlet portion 11 and an outlet portion 12. Contained within the chamber is a source of acid vapor such as the pool 13 of an aqueous hydrochloric acid solution having its surface exposed to the interior of the chamber, as shown. Inlet portion 11 is provided with conduit means 14 which contains a source 15 of ionizing radiation, such as a radioactive material. A gas pumping means 20 is provided for drawing a gas indicated by arrow 16 to be investigated for ammonia content sequentially through conduit 14, through the ionizing radiation of source 15, into and through the reaction chamber 10 wherein ammonia present in the gas reacts with the hydrochloric acid vapor to produce very small suspended particles of ammonia chloride and through outlet 12 to the condensation nuclei counter 21 as schematically shown.

More specifically, and by way of illustration, a 50 milliliter flask was employed as chamber 10 and a polonium alpha source of about 100 millicuries was utilized as source 15. In order to determine the background, clean air was drawn through the chamber 10 which contained a few milliliters of about 20 percent aqueous solution of hydrochloric acid. The condensation nuclei counter indicated a background count of about 1300 nuclei per cubic centimeter with the alpha source in place and with it removed. With the alpha source removed, a standard air sample containing ammonia was drawn through the apparatus and 2100 nuclei per cubic centimeter was indicated by the condensation nuclei counter, a number which was actually 800 nuclei per cubic centimeter when the background value is subtracted. The alpha source was replaced and a similar sample of the same standard air-ammonia mixture was drawn through, producing a nuclei count of about 5,000,000 per cubic centimeter, a gain factor of 6000.

Similar results have been attained using a beta source in place of the alpha source. In this case, the beta source was Krypton 85 of about 20 millicuries strength. The gaseous isotope was enclosed in a container sealed by a film of a polyethylene terephthalate resin about 4 mils in thickness which constituted one wall of the container. The beta particles readily penetrated the resin barrier. The use of a beta particle source has the advantage that the radioactive material may be physically separted from attack by the acid vapor and hence reduces the danger of radioactive contamination of the gas drawn through the apparatus. Since alpha particles are stopped by only a few microns of material, exposure of the material to the acid vapor is possible with the attendant danger of contamination. Krypton 85 is particularly suited for use in the reactor of the invention since it is chemically inert and may be impregnated into materials such as tantalum, eliminating the need to use gaseous Krypton 85 in a sealed container.

While a specific configuration of the apparatus has been described and shown and specific sources of ionizing radiation and chemical reactants have been disclosed in order to exemplify the invention, it will be apparent to those skilled in the art that many modifications in the apparatus and materials may be made within the scope of the invention. It is therefore intended that the invention not be limited except as set forth in the appended claims.

What we claim as new and desire to secure by Letters Patent of the United States is:

1. Gas conversion apparatus comprising a reaction chamber having an inlet and outlet means and a source of a reagent vapor therein, a radioactive material at said inlet providing ionizing radiation effective to ionize gas passing through said inlet into and through said reaction chamber, and means for conducting said gas from said chamber outlet to a condensation nuclei counter.

2. The apparatus set forth in claim 1 wherein said radioactive material is selected from the group consisting of materials which are principally alpha and beta emitters.

3. A method for detecting the presence of and measuring the concentration of a chemically reactive gas contained in a carrier gas which is comparatively chemically inert comprising the steps of exposing the gas mixture to ionizing radiation from a radioactive material, treating the ionized gas mixture with a reagent vapor to convert said chemically reactive gas to condensation nuclei, and counting said condensation nuclei.

4. The method recited in claim 3 wherein said radioactive material is selected from the group consisting of materials which are principally alpha and beta emitters.

5. The method recited in claim 3 wherein said chemically reactive gas is ammonia, said carrier gas is air, and said reagent vapor is hydrochloric acid vapor.

References Cited

UNITED STATES PATENTS

| | | |
|---|---|---|
| 2,968,730 | 1/1961 | Morris et al. |
| 3,102,192 | 8/1963 | Skala _____ 250—43.5 |
| 3,134,898 | 5/1964 | Burnell et al. |

OTHER REFERENCES

Van Luik, Jr. et al.: Analytical Chemistry, vol. 34, pp. 1617–1620 (November 1962).

RALPH G. NILSON, Primary Examiner

M. J. FROME, Assistant Examiner

U.S. Cl. X.R.

23—232, 254